United States Patent
Maier et al.

(10) Patent No.: US 9,303,658 B2
(45) Date of Patent: Apr. 5, 2016

(54) COMPACT TURBOMACHINE SYSTEM WITH IMPROVED SLUG FLOW HANDLING

(71) Applicants: William C. Maier, Almond, NY (US); Pascal Lardy, Houston, TX (US); Jose L. Gilarranz, Katy, TX (US)

(72) Inventors: William C. Maier, Almond, NY (US); Pascal Lardy, Houston, TX (US); Jose L. Gilarranz, Katy, TX (US)

(73) Assignee: Dresser-Rand Company, Olean, NY (US)

( * ) Notice: Subject to any disclaimer, the term of this patent is extended or adjusted under 35 U.S.C. 154(b) by 413 days.

(21) Appl. No.: 13/668,584

(22) Filed: Nov. 5, 2012

(65) Prior Publication Data

US 2013/0112277 A1    May 9, 2013

Related U.S. Application Data

(60) Provisional application No. 61/556,924, filed on Nov. 8, 2011.

(51) Int. Cl.
*F17D 3/12* (2006.01)
*F04D 31/00* (2006.01)
*B01D 17/02* (2006.01)

(52) U.S. Cl.
CPC ................ *F04D 31/00* (2013.01); *B01D 17/02* (2013.01); *Y10T 137/0324* (2015.04); *Y10T 137/2574* (2015.04)

(58) Field of Classification Search
CPC .............. F04B 1/28; F04B 1/34; F04B 23/04; F04B 23/06; F04B 49/08; F04B 49/22; B01D 17/02; Y10T 137/0324; Y10T 137/2574; F04D 31/00; E21B 43/12; E21B 47/10
USPC ........................ 417/26, 43, 53, 307, 309, 310
See application file for complete search history.

(56) References Cited

U.S. PATENT DOCUMENTS

| | | | | |
|---|---|---|---|---|
| 4,160,652 | A * | 7/1979 | Martin et al. ..................... | 95/24 |
| 5,256,171 | A * | 10/1993 | Payne ............................... | 95/19 |
| 5,398,762 | A * | 3/1995 | Stinessen ..................... | 166/356 |
| 5,798,941 | A * | 8/1998 | McLeister ..................... | 700/282 |
| 6,471,487 | B2 * | 10/2002 | Keilty et al. .................... | 417/26 |
| 7,013,978 | B2 * | 3/2006 | Appleford et al. ............ | 166/357 |
| 2006/0122734 | A1 * | 6/2006 | Coward ........................ | 700/282 |
| 2006/0151167 | A1 * | 7/2006 | Aarvik et al. ................. | 166/267 |
| 2007/0199696 | A1 * | 8/2007 | Walford ................... | 166/250.01 |
| 2007/0274842 | A1 * | 11/2007 | Campen et al. ................. | 417/53 |
| 2010/0011876 | A1 * | 1/2010 | Vyas et al. ................. | 73/861.04 |

FOREIGN PATENT DOCUMENTS

WO    WO 2009/133027 A1 *  11/2009 ............. E21B 43/36

* cited by examiner

*Primary Examiner* — Justin Jonaitis
*Assistant Examiner* — Stephen Mick
(74) *Attorney, Agent, or Firm* — Edmonds & Nolte, PC (57) ABSTRACT

A turbomachine system and method, with the system including a slug detector coupled to a main line to detect a slug flow in a multiphase fluid in the main line. The system also includes a compressor fluidly coupled to the main line and disposed downstream of the slug detector, and a bypass line fluidly coupled to the main line upstream of the compressor and downstream of the compressor. The system further includes at least an upstream control valve fluidly coupled to the main line upstream of the compressor and communicably coupled to the slug detector. The upstream control valve is configured to actuate between a normal position, in which the upstream control valve directs fluid to the compressor, and a bypass position, in which the upstream control valve directs fluid to the bypass line, according to when the slug detector detects a slug flow.

17 Claims, 6 Drawing Sheets

COMPACT TURBOMACHINE SYSTEM WITH IMPROVED SLUG FLOW HANDLING

The present application claims priority to U.S. Application No. 61/556,924 filed Nov. 8, 2011. The priority application is hereby incorporated by reference in its entirety into the present application.

BACKGROUND

Turbomachine systems are often used to process multiphase fluids, for example, in pipeline applications, which provide a unique set of challenges to system designers. In some low flow-rate applications, the multiphase fluid may be a relatively well-mixed flow of gas and liquid. As such, a generally expected combination of gas and liquid arrives at the turbomachine, which may be separated and efficiently handled by appropriate fluid handling equipment (e.g., a compressor and a pump). However, in some higher-flow rate systems, a periodic flow may develop, in which, at some points, a disproportionately large percentage of the flow is liquid (i.e., a slug), while at other points, a disproportionately large percentage is gas. In some cases, the slugs can grow to occupy an entire cross-section of the pipeline, such that the denser liquid slugs separate pockets of gas. In severe cases, the slugs are preceded by no flow and followed by high-pressure gas flow. Further, the occurrence and position of the slugs can be relatively difficult to predict.

These slugs present a challenge, as it may be difficult to completely separate them from the gas without depriving the compressor of process fluid or flooding the separator. Accordingly, slug damping techniques and systems are often employed upstream of such processing equipment to reduce slug formation and propagation. Despite precautions taken to avoid the propagation of slugs, however, slugs often still reach the turbomachine systems.

To handle the slugs, the turbomachine systems generally include one or more slug catchers. Various types of slug catchers are known, but the general principle is that the slug catchers provide a buffer volume sufficient to store the largest slugs expected to be received from the pipeline. Accordingly, such slug catchers are typically large and heavy, substantially adding to the footprint of the system. In some applications, however, especially for offshore or subsea hydrocarbon production, space is at a premium, thus it is desirable to reduce the system footprint wherever possible. Each component is, therefore, carefully designed to occupy the least amount of space possible, while still providing for maximum operating efficiency. Slug catchers, however, remain bulky and heavy, as they must provide sufficient volume and handle sufficient pressures to accomplish their function.

What is needed is a system and method for effectively handling slug flow, while providing a reduced footprint for the turbomachine system.

SUMMARY

Embodiments of the disclosure may provide an exemplary turbomachine system. The turbomachine system includes a slug detector coupled to a main line and configured to detect a slug flow in a multiphase fluid in the main line, and a compressor fluidly coupled to the main line and disposed downstream of the slug detector. The turbomachine system also includes a bypass line fluidly coupled to the main line upstream of the compressor and downstream of the compressor. The turbomachine system further includes an upstream control valve fluidly coupled to the main line upstream of the compressor and communicably coupled to the slug detector. The upstream control valve is configured to actuate between a normal position, in which the upstream control valve directs fluid to the compressor, and a bypass position, in which the upstream control valve directs fluid to the bypass line. Further, the upstream control valve is actuated from the normal position to the bypass position when the slug detector detects the slug flow.

Embodiments of the disclosure may also provide an exemplary method for handling slugs in a turbomachine system. The method includes detecting a slug flow in a main line upstream of a compressor with a slug detector, and actuating an upstream control valve in response to a detected slug flow from a normal position, in which the upstream control valve directs fluid toward the compressor, to a bypass position, in which the upstream control valve directs fluid to a bypass line extending from a position upstream of the compressor to a position downstream of the compressor. The method also includes diverting the slug flow around the compressor via the bypass line, and returning the upstream control valve to the normal position when the slug flow has passed through the bypass line.

Embodiments of the disclosure may further provide an exemplary system for handling slugs. The system may include a slug detector disposed upstream of a compressor, the slug detector being configured to detect a slug flow in a main line fluidly coupled to a wellhead, and a bypass line coupled to the main line at a position upstream of the compressor and at a position downstream of the compressor. The system may also include a control valve communicably coupled to the slug detector and fluidly coupled to the main line, the compressor, and to the bypass line. The control valve is configured to actuate from a normal position, in which the control valve directs fluid toward in the main line to the compressor, to a bypass position, in which the control valve diverts fluid to the bypass line when the slug detector detects the slug flow.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1:
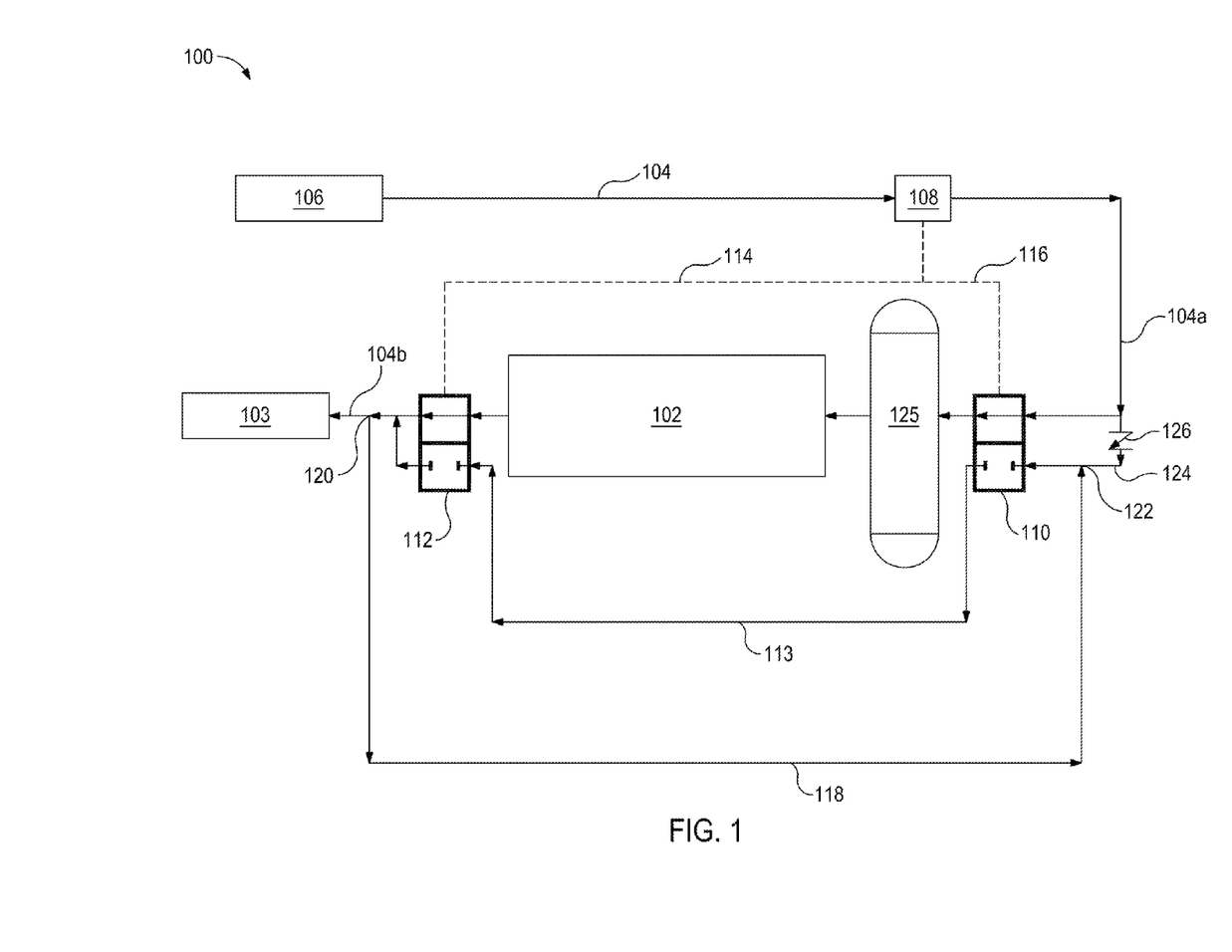
FIG. 1 illustrates a schematic view of an exemplary turbomachine system, according to an embodiment.

FIG. 1 illustrates a schematic view of a turbomachine system 100, according to an embodiment, having an improved slug flow handling capability. Accordingly, the turbomachine system 100 may obviate any need for slug catchers, but may, in some embodiments, be used in conjunction with such traditional slug catchers. The turbomachine system 100 includes a turbomachine assembly 102 fluidly coupled to a main line 104. The main line 104 has an upstream section 104a, which is upstream of the turbomachine assembly 102 and coupled to an inlet 106, and a downstream section 104b, which is downstream of the turbomachine assembly 102 and coupled to an outlet 103. In an embodiment, the main line 104 may be a natural gas pipeline and the inlet 106 may be a wellhead. Accordingly, in some embodiments, at least the turbomachine assembly 102 may be marinized or otherwise protected for location and operation in subsea environments.

The process fluid may be a multiphase fluid. As this term is used herein, "multiphase fluid" is intended to be broadly construed to include combinations of liquids and gasses (e.g., natural gas and water), immiscible liquids (e.g., hydrocarbons and water), gases of different densities, and liquids and/or gasses and solids (e.g., particulate matter such as sand).

After the process fluid reaches the outlet 103, it may proceed downstream for subsequent operation, working, storage, removal, consumption, separation, etc. It will be appreciated that the turbomachine system 100 may be tailored to provide process fluid for any subsequent use. Moreover, the turbomachine assembly 102 may be any suitable machinery configured to remove and/or add energy to a process fluid. Accordingly, the turbomachine assembly 102 may include one or more compressors, separators, turbines, pumps, fans, blowers, combinations thereof, or the like. In at least one embodiment, the turbomachine assembly 102 may be or include a DATUM® C. or DATUM® I centrifugal compressor, commercially-available from Dresser-Rand Co. of Olean, N.Y., USA.

The turbomachine system 100 also includes a slug detector 108 disposed upstream of the turbomachine assembly 102 and fluidly coupled to the upstream section 104a of the main line 104. The slug detector 108 may include any device suitable for detecting a slug, for example, by measuring, calculating, or otherwise detecting density, pressure, mass flow rate, combinations thereof, or changes in one or more of these characteristics in the fluid flow through the main line 104. As the terms are used herein, "slug" and "slug flow" generally refer to a concentrated mass of a higher density portion of the process fluid propagating through a line, e.g., the main line 104. For example, in some oilfield production applications, a slug may be a mass of water moving in a natural gas pipeline.

The slug detector 108 may be a Coriolis tube. One example, among many, of a Coriolis tube slug detector that may be suitable for use as the slug detector 108 is the MIRCO MOTION ELITE®, commercially-available from Emerson Electric Co. of St. Louis, Mo., USA. Without limitation to the present disclosure, further information on Coriolis tubes that may be used in the turbomachine system 100 may be found, for example, in U.S. Pat. Nos. 4,127,028; 4,187,721; 4,491,025; and/or 6,513,393, the entirety of each being incorporated herein by reference to the extent consistent with the present disclosure. In another example, the slug detector 108 may be a sonic flow meter, as is known in the art. In still another example, the slug detector 108 may be coupled to the main line 104 in one or more locations and configured to take pressure measurements to determine when a slug flow exists. One example of such pressure measurement schemes to detect slug flow may be provided as further detailed in U.S. Pat. No. 7,239,967, the entirety of which is incorporated herein by reference to the extent consistent with the present disclosure.

The turbomachine system 100 may also include one or more control valves fluidly coupled to the main line 104, for example, an upstream control valve 110 and a downstream control valve 112, as shown. The upstream control valve 110 may be fluidly coupled to the upstream section 104a of the main line 104 and to a bypass line 113. The downstream control valve 112 may be fluidly coupled to the downstream section 104b of the main line 104 and to the bypass line 113. The control valves 110, 112 may also be communicably coupled to the slug detector 108 via signal lines 114, 116, respectively. In some embodiments, the control valves 110, 112 may be communicably coupled to the slug detector 108 via a controller (not shown). As such, the controller may be configured to interpret signals from the slug detector 108 and send signals to the control valves 110, 112 based on the interpretation of the signals from the slug detector 108. The controller and/or the slug detector 108 may include any suitable CPU, programmable logic controllers (PLC), memory, input connections, output connections, and the like. For example, the controller and/or the slug detector 108 may include a control program stored on a computer readable medium that causes the controller and/or slug detector 108 to receive inputs and generates outputs to cause the control valves 110, 112 to actuate and/or may signal any other components of the system 100 in response to a detected slug flow and/or the completion of a slug flow.

It should be noted that the interposition of a controller between the control valves 110, 112 (or any other component) and the slug detector 108 is intended to be within the scope of the term "communicably coupled" as it is used herein. Further, it will be appreciated that all "signal lines" referred to herein may be fiber optics, copper, pneumatic, hydraulic, or any other type of transmission line, or may be representative of wireless telemetry.

The control valves 110, 112 may each include a normal position, as shown, in which fluid is directed to the turbomachine assembly 102 through the upstream control valve 110 and received from the turbomachine assembly 102 through the downstream control valve 112. The control valves 110, 112 may each be configured to be actuated from the normal position to a bypass position. In the bypass position, the upstream control valve 110 directs fluid from the upstream section 104a, through an upstream section 124 of the bypass line 113, and then to a remainder of the bypass line 113, while preventing it from flowing into the turbomachine assembly 102. When the downstream control valve 112 is in bypass position, it receives fluid from the bypass line 113, directs it to the downstream section 104b, and prevents it from flowing back toward the turbomachine assembly 102. Accordingly, when the control valves 110, 112 are both in the bypass position, fluid flow in the main line 104 bypasses the turbomachine assembly 102 via the bypass line 113. Further, the control valves 110, 112 may be capable of rapidly actuating between the normal and bypass positions according to signals received via the signal lines 114, 116, respectively.

The turbomachine system 100 may also include a high-pressure return line 118 fluidly coupled at both ends to the main line 104. For example, the high-pressure return line 118 may extend from a point 120 of the downstream section 104b of the main line 104, for example, downstream of the downstream control valve 112 to a point 122 upstream of the upstream control valve 110, for example, in the upstream section 124 of the bypass line 113. In other embodiments, however, the point 122 may be in the main line 104 and/or within the upstream control valve 110. A check valve 126 may also be coupled to the bypass line 113, for example, upstream of the point 122 and/or the upstream section 124 of the bypass line 113. The check valve 126 may be configured to allow fluid to flow downstream, but may generally prevent fluid from reversing flow through the main line 104 and travelling back toward the inlet 106.

In an embodiment, an inlet scrubber 125 may be interposed between the turbomachine assembly 102 and the upstream control valve 110. The inlet scrubber 125 may be any suitable device configured to remove contaminants, whether solid particulate matter (e.g., sand), liquid, or gas from the multiphase fluid in the main line 104. A variety of inlet scrubbers (e.g., wet scrubbers, Venturi scrubbers, filtration media, etc.) are well-known and any may be used as required by a given application. In some embodiments, however, the turbomachine assembly 102 may have a built-in tolerance for such contaminants, or may otherwise have the capability of handling and/or separating a given range of such contaminants and thus the inlet scrubber 125 may be omitted.

In operation of the turbomachine system 100, multiphase process fluid is received in the main line 104 from the inlet 106. The fluid flow is monitored by the slug detector 108 and, during normal conditions, is sent to the upstream control valve 110, which is in the normal position. The process fluid is then scrubbed by the inlet scrubber 125, and then sent to the turbomachine assembly 102 for processing (e.g., compression). The process fluid then proceeds out of the turbomachine assembly 102, through the downstream control valve 112, which is also in the normal position, and is then sent to the outlet 103. Prior to reaching the outlet 103, a portion of process fluid may be used to pressurize the high-pressure return line 118, in anticipation of a slug flow condition.

When the slug detector 108 detects a slug flow, it signals to the control valves 110, 112 to actuate and move to the bypass position. In some embodiments, the slug detector 108 may also determine the velocity of the slug flow and may be set to delay signaling the control valves 110, 112 to actuate until as late as is practicable, while still effectively diverting the slug flow. This may provide for a minimum duration of bypass flow and maximize flow sent through the turbomachine assembly 102, thereby also maximizing production. After actuation, the upstream control valve 110 routes the process fluid, which should be a slug at this point, through the bypass line 113 thereby avoiding introducing the slug flow to the turbomachine assembly 102. The slug then proceeds through the downstream control valve 112 and back into the downstream section 104b of the main line 104 and then to the outlet 103. Once the slug detector 108 registers that the slug flow is complete, the slug detector 108 may signal the control valves 110, 112 to actuate back to the normal position. Again, the slug detector 108 may be configured to delay the signal to the control valves 110, 112 to the optimal point to ensure full slug diversion, while avoiding normal flow bypassing the turbomachine assembly 102, as far as is practicable.

While the slug flow is bypassing the turbomachine assembly 102, it is urged to continue moving downstream by pressure provided via the high-pressure return line 118. The check valve 126 prevents the pressure received from the high-pressure return line 118 from being transmitted, and potentially reversing flow, through the upstream section 104a of the main line 104. Accordingly, the pressure in the downstream section 104b of the main line 104 is generally constant, as the slug flow is pressurized to the pressure downstream of the turbomachine assembly 102 during normal conditions. As such, pressure at the outlet 103 remains generally constant, which may facilitate subsequent, downstream processing.

When the slug flow has passed through the bypass line 113, the slug flow may be considered finished. As such, the slug detector 108 and/or another controller (not shown) may signal to the upstream and downstream control valves 110, 112 to actuate back to the normal position, to restart normal flow to the turbomachine assembly 102.

Figure 2:
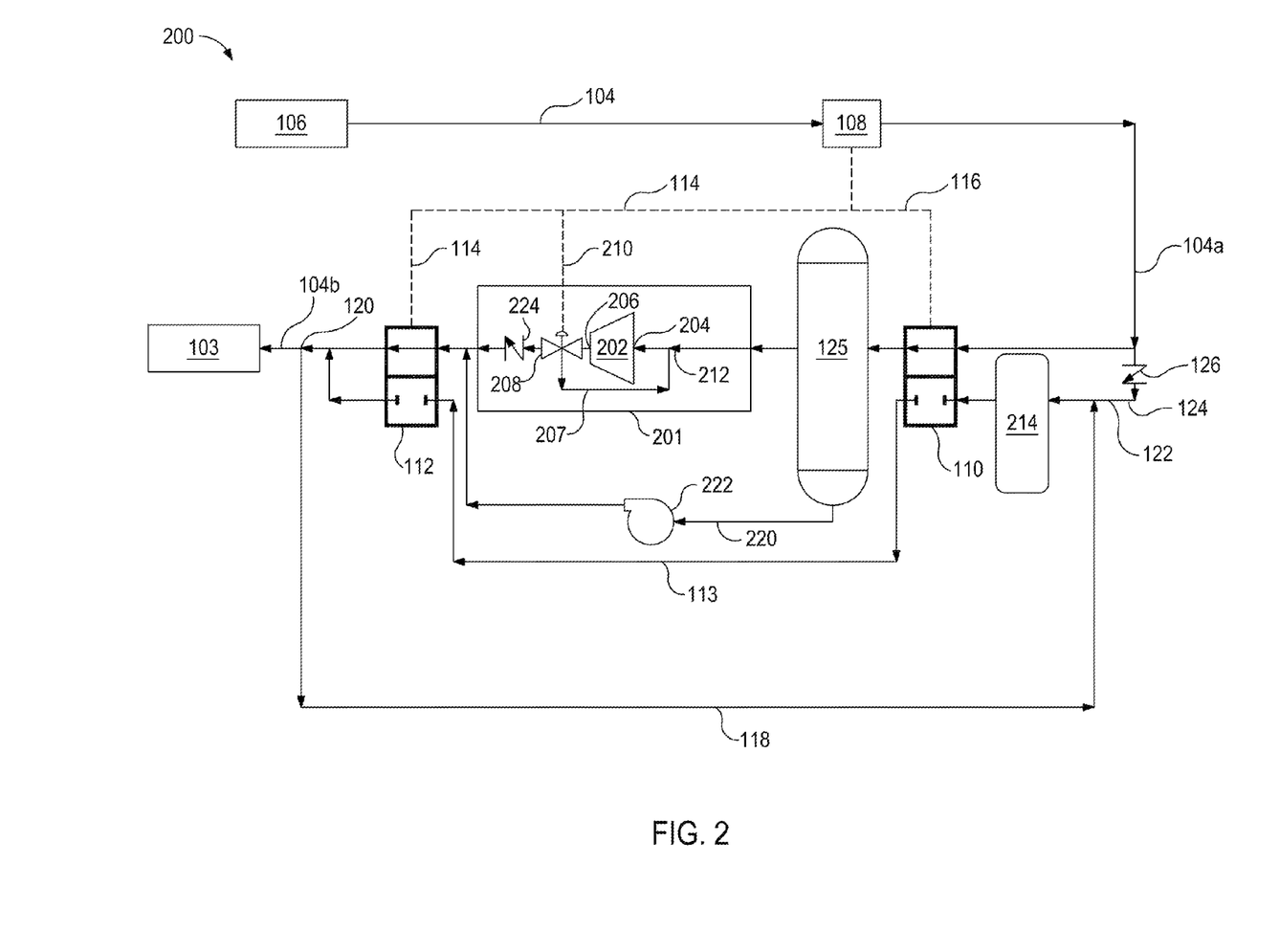
FIG. 2 illustrates a schematic view of another exemplary turbomachine system, according to an embodiment.

FIG. 2 illustrates a schematic view of another turbomachine system 200, according to an embodiment. The turbomachine system 200 may be similar in structure and function to the turbomachine 100 and, as such, like components are given like reference numerals in both and will not be described in duplicate herein. The turbomachine system 200 includes a turbomachine assembly 201, which includes a compressor 202, as shown. The compressor 202 has an inlet 204 and an outlet 206 and is configured to pressurize gas therebetween. Further, the turbomachine assembly 201 may include an anti-surge loop, which, as shown, may include an anti-surge line 207 and a valve 208. The valve 208 may be communicably coupled to the slug detector 108 via a signal line 210. Further, the valve 208 may be configured to be actuated between a normal position, in which compressed gas received from the compressor outlet 206 proceeds therethrough to the downstream control valve 112, and a bypass position, in which compressed gas received from the compressor outlet 206 is directed to the anti-surge line 207. The anti-surge line 207 extends from the valve 208 to a position 212 in the main line 104 upstream of the compressor inlet 204, but, for example, downstream of the inlet scrubber 125. Although not shown, it will be appreciated that the anti-surge loop may be employed with the turbomachine system 100 shown in and described above with reference to FIG. 1.

The turbomachine system 200 may also include a secondary bypass line 220, which is fluidly coupled to the inlet scrubber 125 and to a point downstream of the turbomachine assembly 201, for example, between the turbomachine assembly 201 and the downstream control valve 112. The turbomachine system 200 may further include a pump 222 in the secondary bypass line 220, which may be controlled remotely, manually, or by the slug detector 108 (or a control system (not shown) associated therewith). In such an embodiment, the turbomachine assembly 201 may also include a check valve 224 to prevent backflow of fluid in the secondary bypass line 220 into the turbomachine assembly 201.

Further, the turbomachine system 200 may include a fluid vessel 214 designed to facilitate fluid transfer. The fluid vessel 214 may be an accumulator and may include a pump therein. The fluid vessel 214 may be fluidly coupled to the upstream section 124 of the bypass line 113, as shown. In other embodiments, the fluid vessel 214 may be coupled to the upstream section 104a or downstream section 104b of the main line 104, or may be coupled to the bypass line 113, downstream of the upstream control valve 110. The fluid vessel 214 may be coupled to upstream section 124 of the bypass line 113 either directly or via one or more valves (not shown). If such valves are used, they may be actuated by a controller (not shown) and/or the slug detector 108. Further, the fluid vessel 214 may be configured to contain a quantity of process fluid, for example, it may be configured to catch a portion of the slug flow upstream of the turbomachine assembly 201.

A pump (not shown) coupled to the fluid vessel 214 may be communicably coupled to the slug detector 108 via a signal line (not shown). The fluid vessel 214 may be configured to increase the pressure and/or urge process fluid from the fluid vessel 214, through the bypass line 113, and into the downstream section 104b of the main line 104 during slug bypass. This may ensure a relatively constant pressure in the downstream section 104b of the main line 104 and to the outlet 103, despite slug flow conditions.

In addition to the operation of the turbomachine system 100 discussed above with respect to FIG. 1, the turbomachine system 200 may avoid surge conditions in the compressor 202 and may maintain or otherwise stabilize pressure in the downstream section 104b of the main line 104 during slug bypass. Before, when, or shortly after the slug detector 108 signals the control valves 110, 112 to actuate to the bypass position, the slug detector 108 may also signal the anti-surge valve 208 to actuate to its bypass position. As flow is routed around the compressor 202 in the bypass line 113, the compressor 202 is provided with a continuous flow of process gas via the anti-surge line 207, thereby avoiding surge conditions. Further, although not shown, the anti-surge loop may include one or more pressure-reducing structures (e.g., an expander such as an expansion valve) to provide fluid to the compressor inlet 204 at a suitable pressure.

Further, when slug flow is detected, or intermittently during normal flow conditions, the pump 222 may be powered on to remove liquid from the inlet scrubber 125. The liquid removed from the inlet scrubber 125 may be pumped to pressure by the pump 222 and routed via the secondary bypass line 220 around the compression system 201 for processing downstream.

Figure 3:
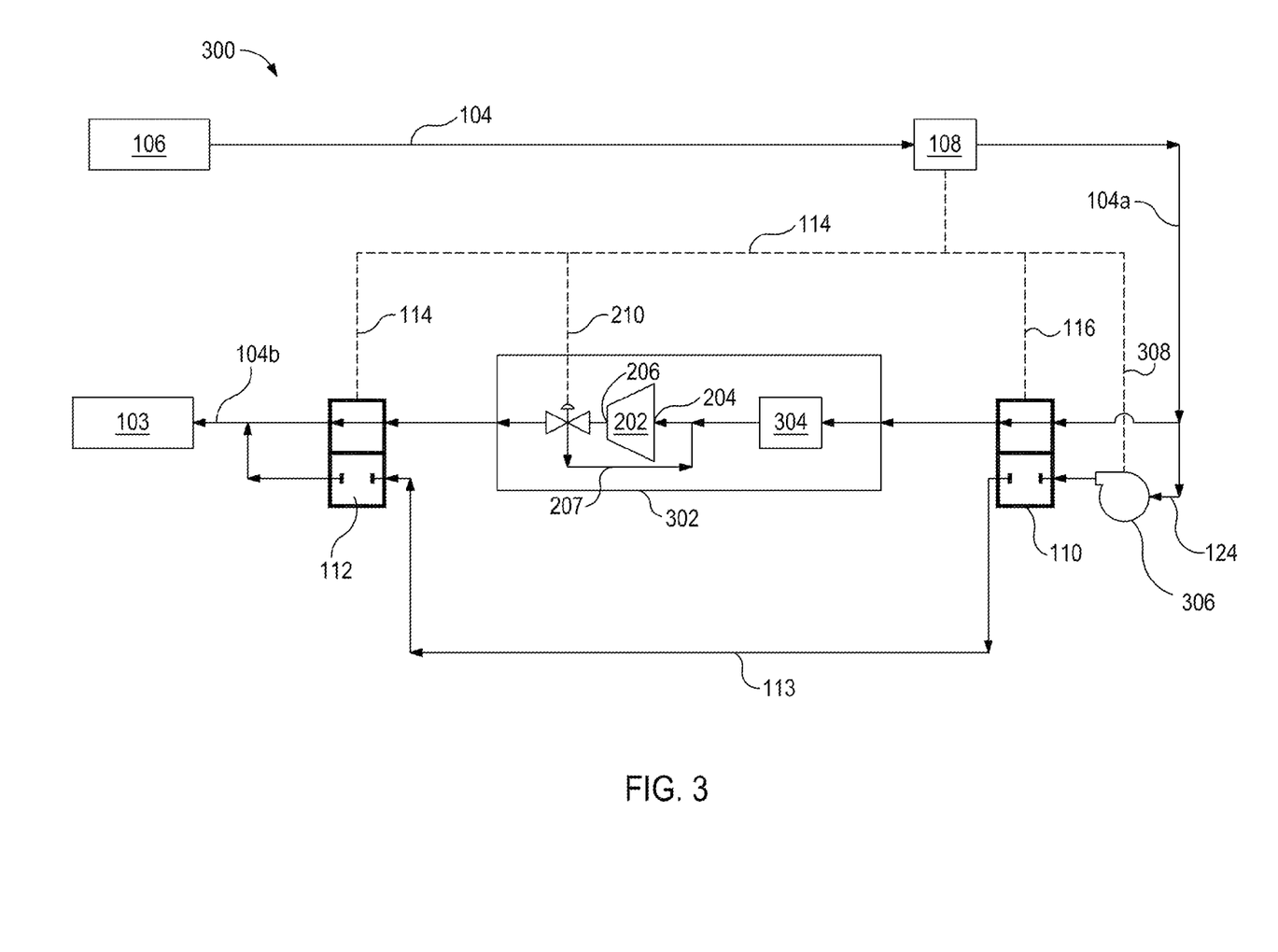
FIG. 3 illustrates a schematic view of yet another exemplary turbomachine system, according to an embodiment.

FIG. 3 illustrates another turbomachine system 300, according to an embodiment. The turbomachine system 300 may be similar in structure and function to the turbomachine systems 100 and 200 and, as such, like components are given like reference numerals in both and will not be described in duplicate herein. The turbomachine system 300 includes a turbomachine assembly 302 coupled to the main line 104 and around which the bypass line 113 is configured to divert slugs, as described above with reference to FIG. 1. The illustrated turbomachine assembly 302 includes the compressor 202 and the anti-surge loop discussed above with respect to FIG. 2.

The illustrated turbomachine assembly 302 includes a separator 304 and, as such, the turbomachine system 300 may omit the inlet scrubber 125 (FIGS. 1 and 2). Some embodiments of the turbomachine systems 100, 200 may, however, include separators. The separator 304 may be a dynamic separator, such as a rotary separator, a static separator, or a combination thereof. Further, the separator 304 may be disposed in a common casing (not shown) with the compressor 202 and/or may have one or more components rotatable on a common shaft (not shown) with the compressor 202. One example of such a configuration may be the DATUM® I, commercially-available from Dresser-Rand Co. of Olean, N.Y., USA.

The separator 304 may be configured to separate a higher-density component (e.g., liquids and/or solids) from a lower-density component (e.g., gas) of the multiphase fluid. As such, the separator 304 may provide the turbomachine assembly 302 with on-board contaminant handling ability as well as some ability to handle an amount slug flow. However, large slug flow may still flood the separator 304 and/or components of the drainage system thereof (e.g., gas break vessels); accordingly, the slug detector 108 may be configured to divert larger slug flows around the turbomachine assembly 302, while relying on the separator 304 to handle smaller slugs. This may enable the use of the bypass line 113 to be reduced, thereby providing longer durations of uninterrupted flow to the compressor 202.

The turbomachine system 300 may also include a pump 306 fluidly coupled, for example, to the upstream section 124 of the bypass line 113. In other embodiments, the pump 306 may be fluidly coupled to any section of the main line 104, or may be fluidly coupled to the bypass line 113, downstream from the upstream control valve 110. The pump 306 may be controlled by the slug detector 108 and/or a controller (not shown) via a signal line 308. Accordingly, the pump 306 may be off during normal conditions, but may be turned on when, or shortly after, the slug detector 108 detects a slug flow. When the slug reaches the pump 306, the pump 306 may pressurize the slug flow to or to approximately the same pressure to which the compressor 202 normally raises the process gas. The pressurized slug flow may then be routed through the bypass line 113, via the upstream control valve 110, and then to the outlet 103 via the downstream control valve 112 and the downstream section 104b of the main line 104. Accordingly, the pressure of the fluid flow seen at the outlet 103 may be approximately constant, notwithstanding slug flow conditions. As such, the turbomachine system 300 may omit the high-pressure return line 118, but in other embodiments, may include both the pump 306 and the high-pressure return line 118.

Figure 4:
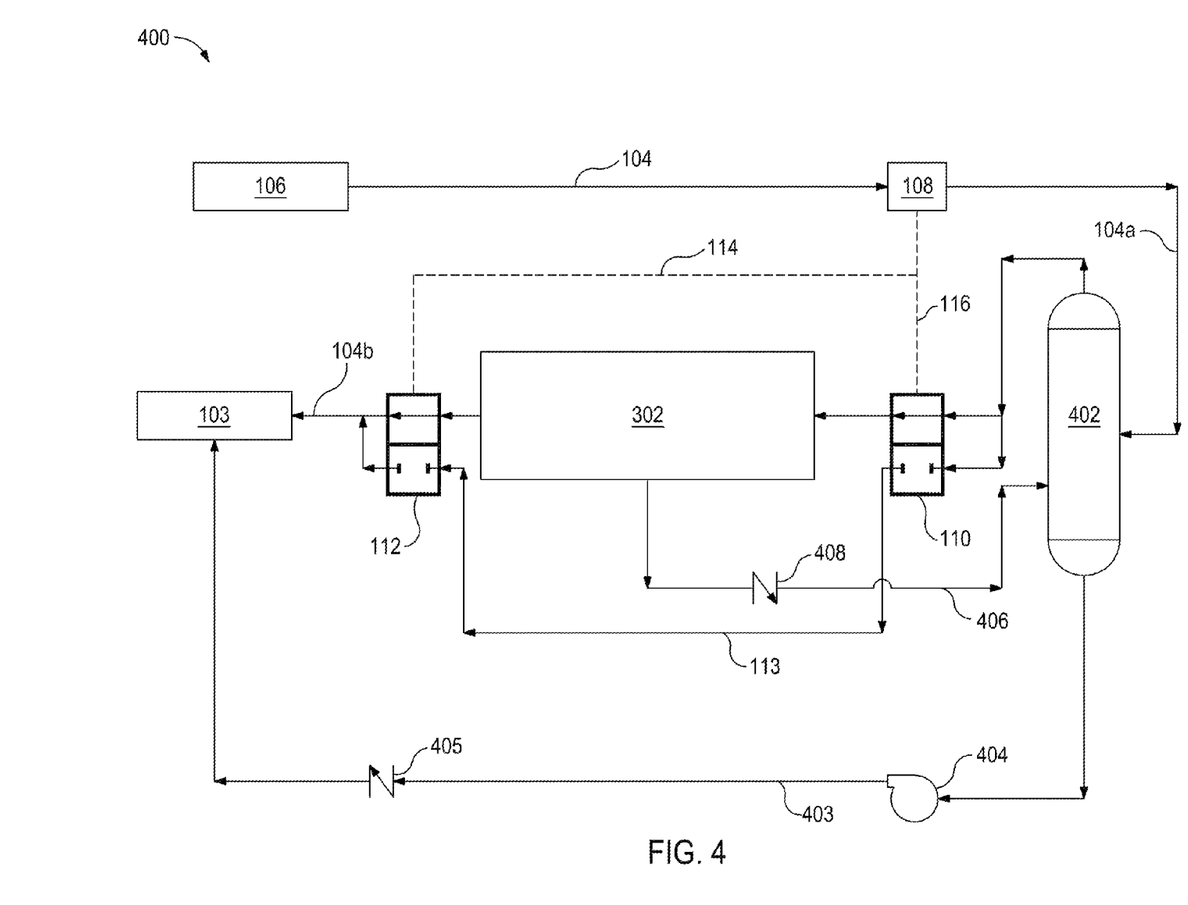
FIG. 4 illustrates a schematic view of still another exemplary turbomachine system, according to an embodiment.

FIG. 4 illustrates another exemplary turbomachine system 400, according to an embodiment. The turbomachine system 400 may be similar to one of the turbomachine systems 100, 200, 300 previously described; as such, like components are given like reference numerals in both and will not be described in duplicate herein. The turbomachine system 400 includes a separator 402, which may be positioned upstream from the upstream bypass valve 110. The separator 402 may be a gravity-base separator or sedimentation tank and may be included, for example, in lieu of the inlet scrubber 125 (FIGS. 1-3), but may have generally the same structural features.

The turbomachine system 400 may also include a second bypass line 403, extending from the separator 402 and to the outlet 103. The second bypass line 403 may include a pump 404 and a check valve 405. Further, the drain from any other separation device (not shown) within the compression system 102, such as, for example, the separator 304 (FIG. 3), may also be connected fluidly to the separator 402 via line 406. Fluid from the turbomachine assembly 302 separated from the process stream may be delivered to the separator 402 via line 406. The line 406 may have a check valve 408 to prevent liquid flow back into the turbomachine assembly 302.

In operation when the slug detector 108 detects a slug situation, bypass valves 110 and 112 are actuated such that the bypass line 113 is opened, routing the slug from the separator 402, around the turbomachine assembly 302, and to the outlet 103. The slug may thus flow in a self-pressurized manner through the bypass line 113. Additionally or alternatively, the pump 404 may be used to pump the slug from the separator 402, through the check valve 405, so as to prevent back-flow, and to the outlet 103. As such, the secondary bypass line 403 serves to provide a pump-assisted flow around the turbomachine assembly 302.

Figure 5:
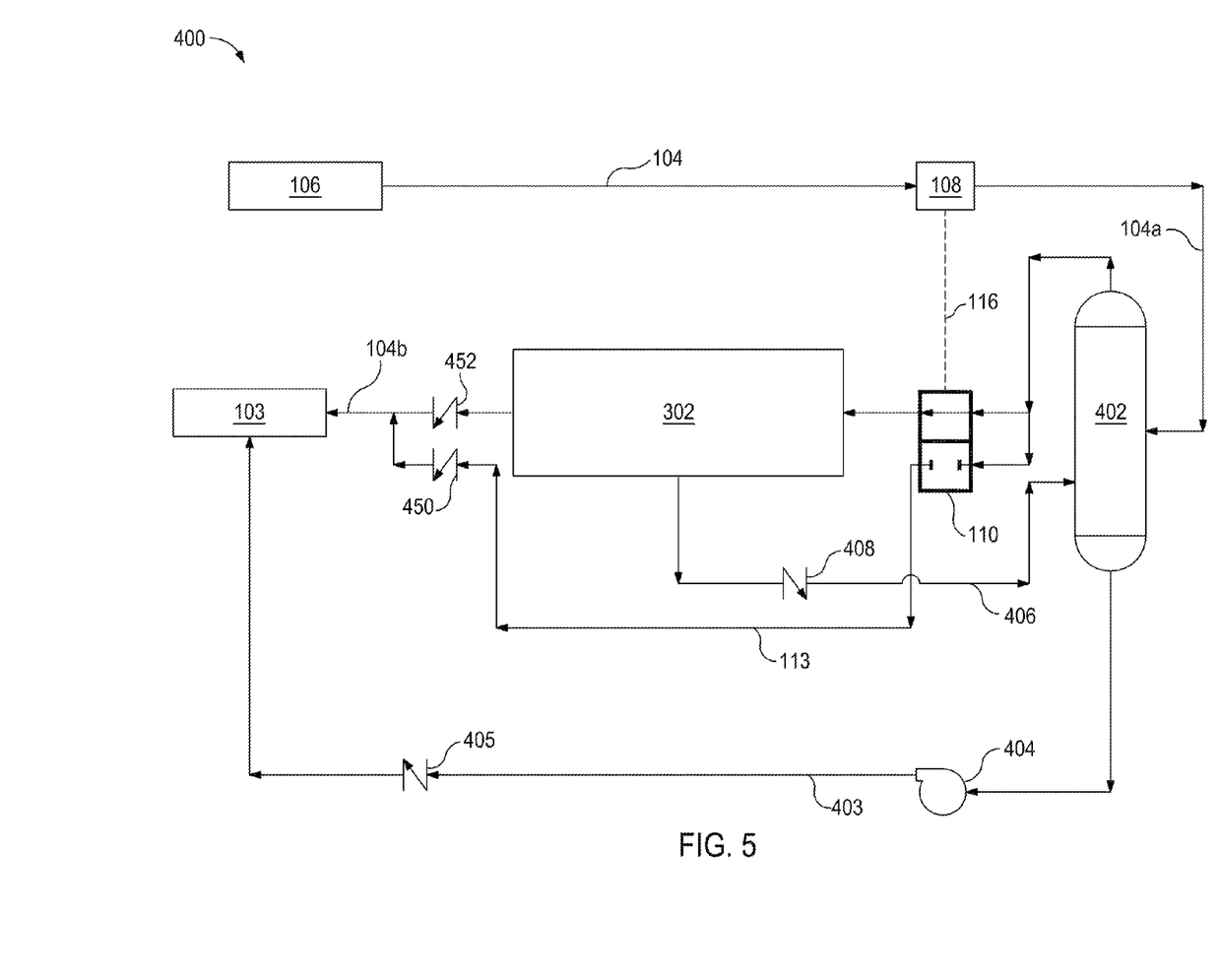
FIG. 5 illustrates a schematic view of another exemplary embodiment of the turbomachine system of FIG. 4.

FIG. 5 illustrates another exemplary embodiment of the turbomachine system 400. As shown, the downstream bypass valve 112 (FIG. 4) may be substituted with a pair of check valves 450, 452. As such, selection of whether the process flow proceeds into or around the turbomachine assembly 302 is controlled by the upstream control valve 110. The check valves 450, 452 ensure that backflow is prevented into the non-selected route, thereby obviating a need for a downstream control valve. This may simplify the turbomachine system 400; however, in other embodiments, as discussed above, a downstream control valve may be beneficial to provide precision control of the system or for any other reasons as understood by one with skill in the art.

Figure 6:
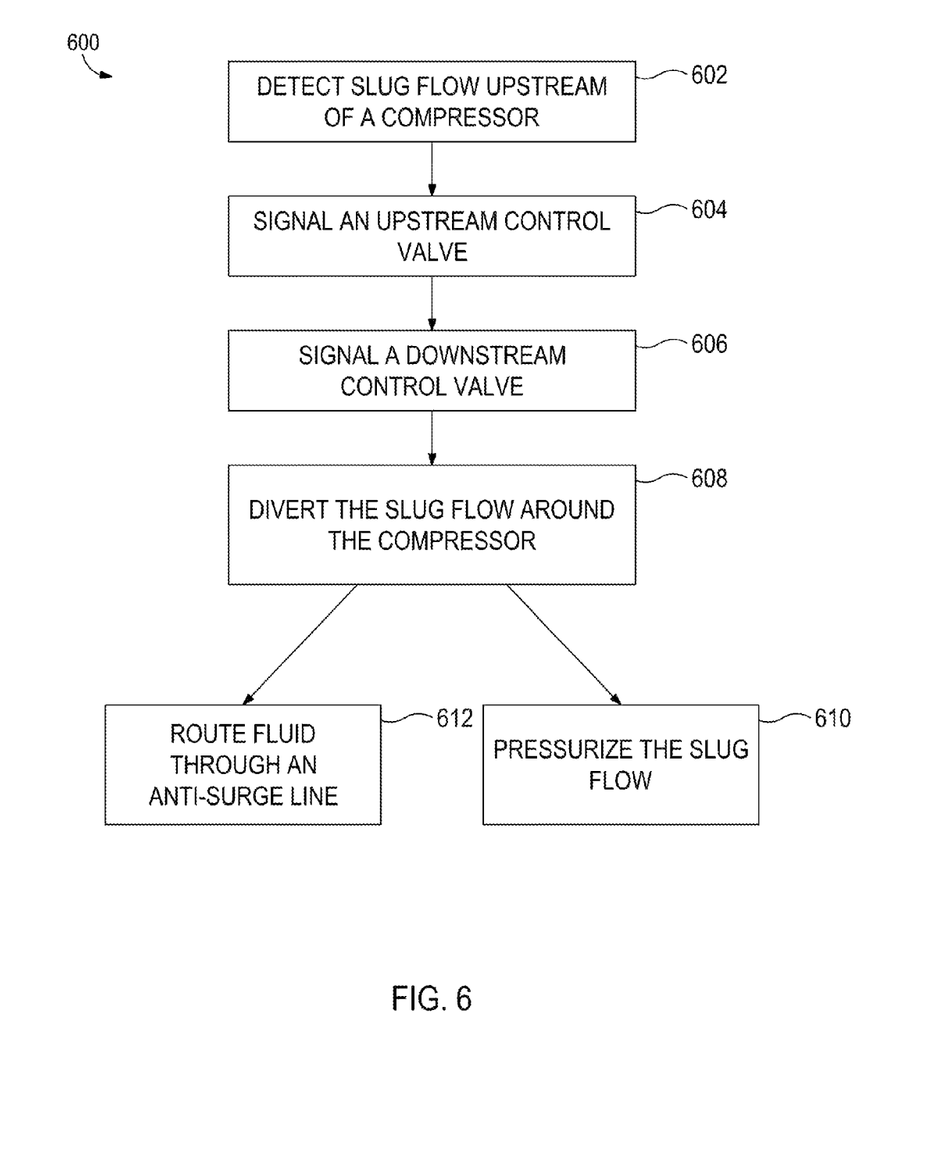
FIG. 6 illustrates a flowchart of an exemplary method for handling slug flow, according to an embodiment.

FIG. 6 illustrates a flowchart of a method 400 for handling slug flow in a turbomachine system, such as one or more of the turbomachine systems 100-400 described above. In an embodiment, the method 600 may include detecting a slug flow in a main line upstream of a compressor with a slug detector, as at 602. The method 600 may also include signaling an upstream control valve to actuate from a normal position to a bypass position, as at 604. In the normal position, the upstream control valve directs fluid toward the compressor. In the bypass position, the upstream control valve directs fluid to a bypass line extending from a position upstream the compressor to a position downstream of the compressor. Simultaneously, before, or after signaling at 604, the method 600 may include signaling a downstream control valve to actuate from a normal position to a bypass position, as at 606. In the normal position, the downstream control valve receives a fluid flow from the compressor. In contrast, when in the bypass position, the downstream control valve receives a fluid flow (e.g., slug flow) from the bypass control line.

The method 600 may also include diverting the slug flow through the upstream control valve to the bypass line, as at 608. The method 600 may also include pressurizing the slug flow in the bypass line with a high pressure line extending from the main line downstream of the compressor to the main line upstream of the upstream control valve, as at 610. Further, the method 400 may include routing fluid through an anti-surge line extending from downstream of the compressor to upstream of the compressor, as at 612. The method 600 may then proceed to signaling the upstream control valve to return to the normal position when the slug flow is finished, as at 614, whereupon the method 600 may restart.

In an embodiment, detecting the slug flow at 602 may include using a Coriolis flow meter, a sonic flow meter, or both to detect the slug flow. Further, in at least one embodiment, the method 600 may include separating a multiphase fluid upstream of the compressor using a separator, an inlet scrubber, or a combination thereof. Additionally, the method 600 may include pumping fluid from an accumulator while the upstream control valve is in the bypass position to maintain pressure in the main line downstream of the compressor.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A turbomachine system, comprising:
    a slug detector coupled to a main line and configured to detect a slug flow in a multiphase fluid in the main line;
    a compressor fluidly coupled to the main line and disposed downstream of the slug detector;
    a bypass line fluidly coupled to the main line upstream of the compressor and downstream of the compressor;
    an upstream control valve fluidly coupled to the main line upstream of the compressor and communicably coupled to the slug detector, the upstream control valve being configured to actuate between a normal position, in which the upstream control valve directs fluid to the compressor, and a bypass position, in which the upstream control valve directs fluid including the slug flow to the bypass line, wherein the upstream control valve is actuated from the normal position to the bypass position when the slug detector detects the slug flow; and
    an accumulator fluidly coupled to the bypass line downstream from the upstream control valve and configured to receive at least a portion of the slug flow directed to the bypass line.

2. The turbomachine system of claim 1, further comprising an inlet scrubber disposed upstream of the compressor.

3. The turbomachine system of claim 1, further comprising a first separator disposed upstream of the compressor and configured to separate a higher-density component of the multiphase fluid from a lower-density component thereof.

4. The turbomachine system of claim 1, wherein the slug detector includes a Coriolis flow meter, a sonic flow meter, or a combination thereof.

5. The turbomachine system of claim 1, wherein the compressor is configured to be positioned subsea.

6. The turbomachine system of claim 1, further comprising a downstream control valve fluidly coupled to the main line downstream of the compressor, the downstream control valve being configured to be actuated between a normal position, in which the downstream control valve receives fluid from the compressor, and a bypass position, in which the downstream control valve receives fluid including the slug flow from the bypass line.

7. The turbomachine system of claim 6, further comprising:
   a check valve fluidly coupled to the main line and disposed upstream of the upstream control valve, the check valve being configured to prevent reverse flow through the main line; and
   a return line fluidly coupled to the main line upstream of the upstream control valve and fluidly coupled to the main line downstream of the downstream control valve, the return line being configured to pressurize the slug flow proceeding through the bypass line.

8. The turbomachine system of claim 1, further comprising an anti-surge loop extending between a compressor outlet and a compressor inlet, the anti-surge loop being configured to shunt fluid from the compressor outlet to the compressor inlet during a slug bypass.

9. A method for handling slugs in a turbomachine system, comprising:
   detecting a slug flow in a main line upstream of a compressor with a slug detector;
   actuating an upstream control valve in response to a detected slug flow from a normal position, in which the upstream control valve directs fluid toward the compressor, to a bypass position, in which the upstream control valve directs fluid including the slug flow to a bypass line extending from a position upstream of the compressor to a position downstream of the compressor;
   diverting the slug flow around the compressor via the bypass line, wherein diverting the slug flow around the compressor via the bypass line comprises receiving at least a portion of the slug flow in an accumulator fluidly coupled to the bypass line downstream from the upstream control valve; and
   returning the upstream control valve to the normal position when the slug flow has passed through the bypass line.

10. The method of claim 9, wherein detecting the slug flow comprises using a Coriolis flow meter, a sonic flow meter, or both to detect the slug flow.

11. The method of claim 9, further comprising actuating a downstream control valve in response to a detected slug flow from a normal position, in which the downstream control valve receives fluid from the compressor, to a bypass position, in which the downstream control valve receives fluid including the slug flow from the bypass line.

12. The method of claim 9, further comprising routing fluid through an anti-surge line extending from downstream of the compressor to upstream of the compressor.

13. The method of claim 9, further comprising pressurizing the slug flow in the bypass line with a return line extending from the main line downstream of the compressor to the main line upstream of the upstream control valve.

14. The method of claim 9, further comprising pumping fluid in the bypass line with a pump while diverting the slug flow.

15. The method of claim 14, wherein pumping fluid in the bypass line with the pump comprises pumping fluid from the accumulator.

16. A system for handling slugs, comprising:
   a slug detector disposed upstream of a compressor, the slug detector being configured to detect a slug flow in a main line fluidly coupled to a wellhead;
   a bypass line coupled to the main line at a position upstream of the compressor and at a position downstream of the compressor;
   a control valve communicably coupled to the slug detector and fluidly coupled to the main line, the compressor, and to the bypass line, the control valve configured to actuate from a normal position, in which the control valve directs fluid in the main line toward the compressor, to a bypass position, in which the control valve diverts fluid including the slug flow to the bypass line when the slug detector detects the slug flow; and
   an accumulator fluidly coupled to the bypass line downstream from the control valve and configured to receive at least a portion of the slug flow directed to the bypass line.

17. The system of claim 16, further comprising:
   an anti-surge line configured to direct fluid from an outlet of the compressor back to an inlet of the compressor when the control valve is in the bypass position; and
   a return line fluidly coupled to the main line at a position downstream of the compressor and a position upstream of the compressor, the return line configured to pressurize the slug flow in the bypass line.

* * * * *